(12) United States Patent
Blagborne

(10) Patent No.: US 6,190,498 B1
(45) Date of Patent: Feb. 20, 2001

(54) EVAPORATOR

(75) Inventor: Kim Blagborne, Summerland (CA)

(73) Assignee: Slimline Mfg. Ltd., Penticton (CA)

( * ) Notice: Under 35 U.S.C. 154(b), the term of this patent shall be extended for 0 days.

(21) Appl. No.: 09/241,071

(22) Filed: Feb. 1, 1999

(51) Int. Cl.[7] ................................. B01D 1/30; B01D 1/16
(52) U.S. Cl. ................... 159/4.01; 159/4.04; 159/4.08; 159/16.1; 159/34; 159/48.1; 159/DIG. 41; 165/67; 202/83; 202/266
(58) Field of Search ................................ 202/83, 236, 238, 202/246, 266, 237; 239/77; 159/34, 48.1, 4.2, 4.3, DIG. 41, 4.01, 4.08, 4.04, 16.1; 165/67–68, 908, 911; 248/574; 203/90, 49

(56) References Cited

U.S. PATENT DOCUMENTS

| | | | |
|---|---|---|---|
| 2,224,076 | * 12/1940 | Gatzweiler | 159/16.1 |
| 3,760,566 | * 9/1973 | Zievers et al. | 159/4.01 |
| 3,867,234 | * 2/1975 | Smith et al. | 159/4.2 |
| 4,622,102 | * 11/1986 | Diebel | 202/83 |
| 4,762,538 | * 8/1988 | Michler et al. | 159/DIG. 41 |
| 4,834,840 | * 5/1989 | Capella | 202/176 |
| 5,082,525 | * 1/1992 | Travis | 202/182 |
| 5,167,763 | * 12/1992 | Sakamoto | 159/48.1 |
| 5,573,661 | * 11/1996 | Rachak | 159/16.1 |
| 5,582,680 | * 12/1996 | Van Kouwenberg | 202/83 |

\* cited by examiner

Primary Examiner—Virginia Manoharan
(74) Attorney, Agent, or Firm—George A. Seaby

(57) ABSTRACT

A relatively simple portable evaporator for quickly evaporating large volumes of water includes a stand with adjustable legs, a frame carrying a tubular housing and a motor rotatably mounted on the stand for rotation around a vertical axis, a fan in the housing driven by the motor, a nozzle rotatably mounted on one end of the housing for directing air from the fan upwardly and outwardly from the housing, and a manifold carrying a plurality of jets for receiving water from a tailings pond or other source and spraying the water into a stream of air exiting the nozzle for expediting evaporation.

6 Claims, 7 Drawing Sheets

EVAPORATOR

BACKGROUND OF THE INVENTION

1. Field of the Invention

This invention relates to an evaporator, and in particular to a portable evaporator for use in the mining industry.

Specifically, the invention relates to an evaporator for use in the mining industry to reduce the volume of water in tailings ponds during reclamation. In order to keep the volume of water in tailings ponds to a minimum, it is necessary to supplement natural evaporation using a mechanical spraying device or evaporator. The evaporator jets fine streams of liquid from a tailings pond into a stream of air under pressure to effect evaporation of large volumes of liquid. It will be appreciated that the evaporator can be used for other purposes, i.e. for evaporating water other than that taken from tailings ponds.

2. Discussion of the Prior Art

Spraying devices or evaporators of the types disclosed herein are by no means new. Examples of such apparatus are disclosed by U.S. Pat. No. 3,069,091, issued to R. C. Giesse et al on Dec. 18, 1962; U.S. Pat. No. 3,269,657, issued to V. P. M. Ballu on Aug. 30, 1966; U.S. Pat. No. 3,319,890, issued to D. E. Wolford on May 16, 1967; U.S. Pat. No. 3,883,073, issued to V. P. M. Ballu on May 13, 1975; U.S. Pat. No. 5,269,461, issued to J. F. Davis on Dec. 14, 1993 and U.S. Pat. No. 5,299,737, issued to C. D. McGinnis et al on Apr. 5, 1994.

In general, while existing devices perform the desired function in varying degrees of efficiency, it has been found that a need still exists for an evaporator which can be used on virtually any terrain for quickly evaporating large volumes of liquid.

GENERAL DESCRIPTION OF THE INVENTION

The object of the present invention is to meet the above defined need by providing a relatively simple, efficient, portable evaporator, which can be used on uneven terrain.

Accordingly, the present invention relates to an evaporator for quickly evaporating large volumes of liquid comprising:

(a) a stand for supporting the evaporator in a fixed position;

(b) a frame rotatable on said stand for rotation around a vertical axis;

(c) a tubular horizontal housing on said frame, said housing having first and second open ends;

(d) a fan in said housing;

(e) a motor on said frame at the first open end of said housing for driving said fan to move air through said housing from said first open end to the second open end thereof;

(f) an elongated tubular nozzle extending upwardly and outwardly from said second open end of said housing for discharging a stream of air from the evaporator;

(g) a manifold around an upper outlet end of said nozzle for receiving liquid from a source thereof; and (h) a plurality of jets in said manifold for discharging atomized liquid into the stream of air exiting said nozzle, whereby evaporation of the liquid is facilitated.

BRIEF DESCRIPTION OF THE DRAWINGS

The invention is described below in greater detail with reference to the accompanying drawings, which illustrate a preferred embodiment of the invention, and wherein.

DESCRIPTION OF THE PREFERRED EMBODIMENT

Figure 1:
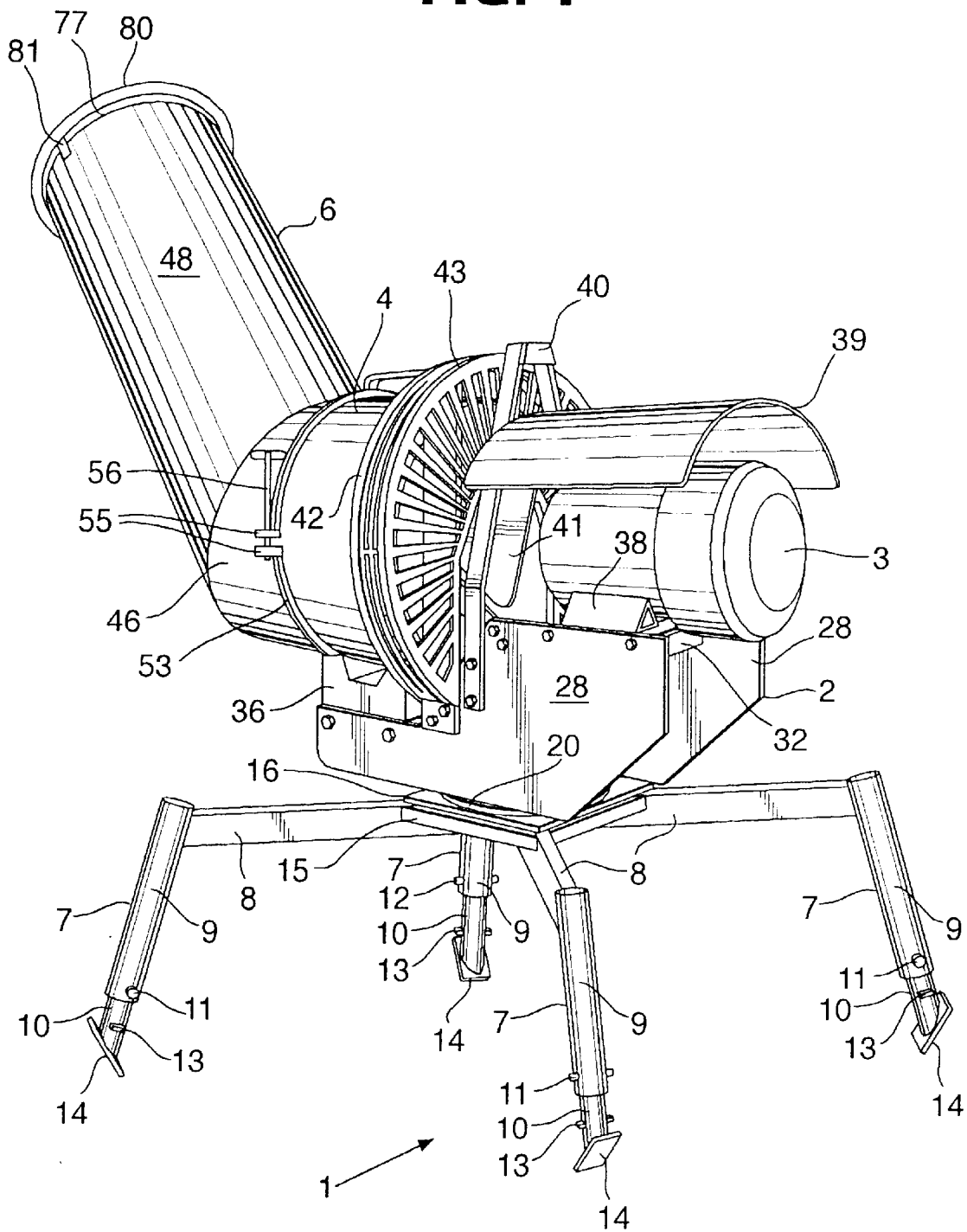
FIG. 1 is a perspective view of an evaporator in accordance with the present invention.
Figure 2:
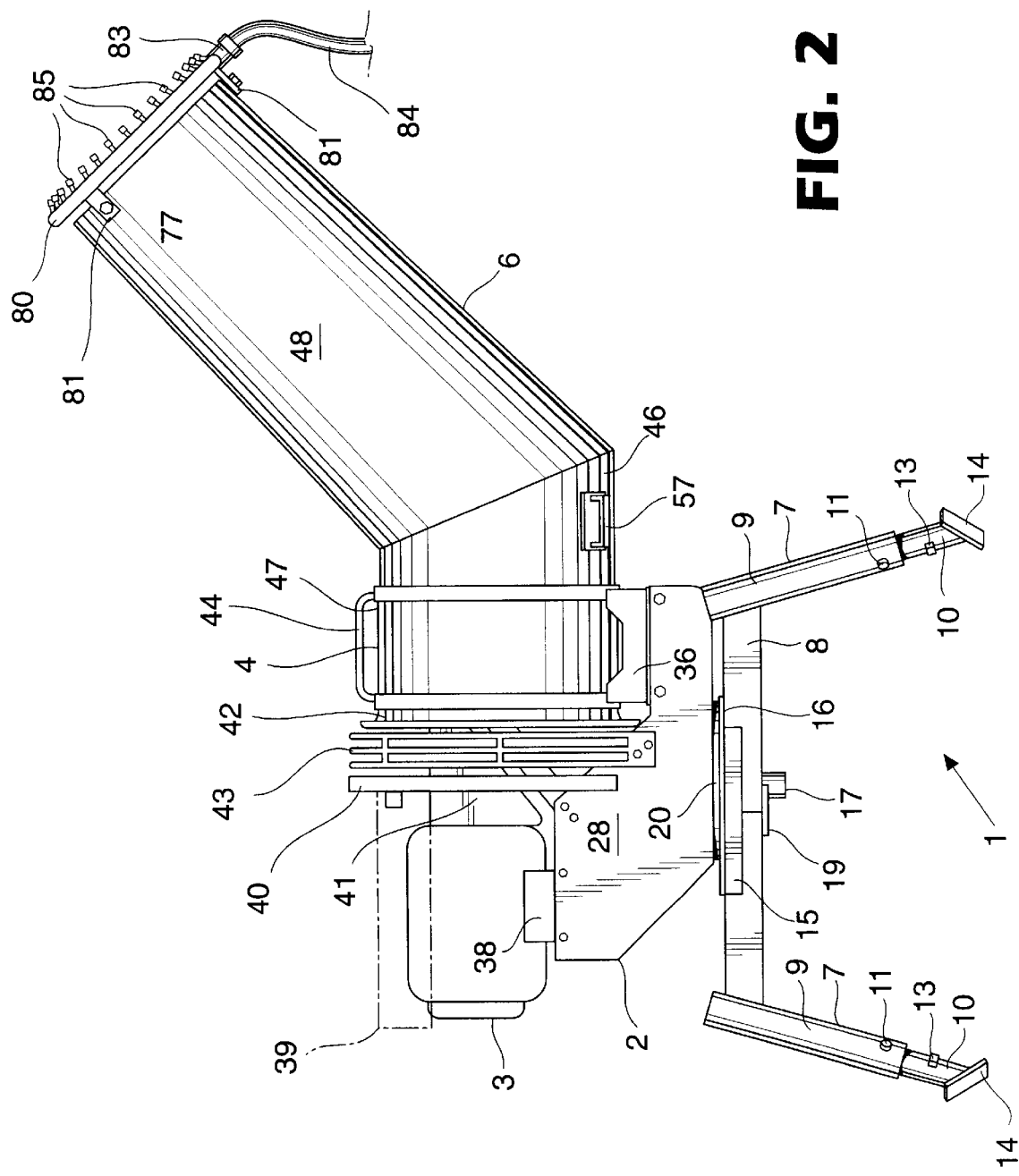
FIG. 2 is a side view of the evaporator of FIG. 1.

With reference to FIGS. 1 and 2, the basic elements of the evaporator include a stand generally indicated at 1, a frame 2 rotatably mounted on the stand 1 carrying a motor 3 and a housing horizontal 4, and a discharge nozzle 6 for discharging a stream of air and fine water droplets from the evaporator.

Figure 3:
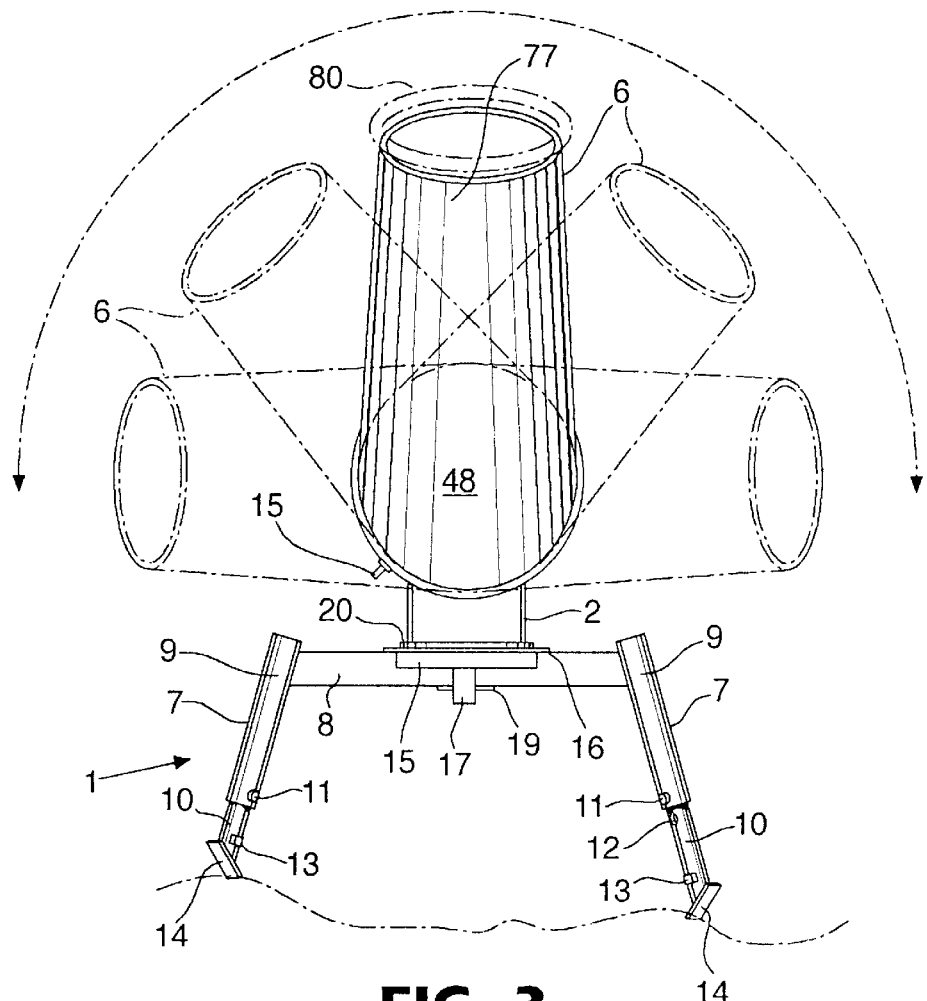
FIG. 3 is a schematic front view of the evaporator of FIGS. 1 and 2.
Figure 5:
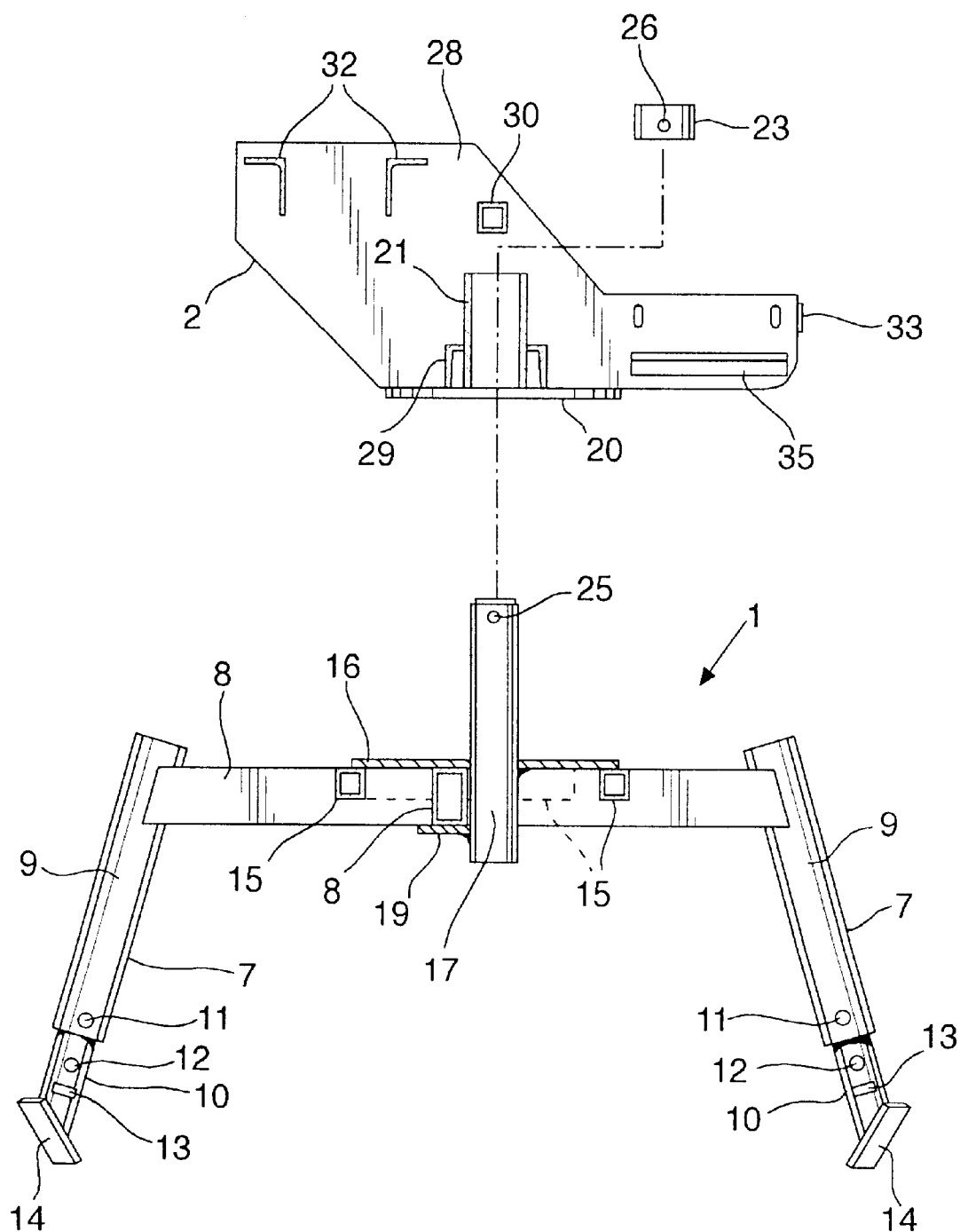
FIG. 5 is a partly exploded, cross-sectional view of the stand and the frame of FIG. 4.

The stand 1 is defined by four extensible legs 7 supporting a pair of crossbars 8 at their upper ends. Each leg 7 includes a tubular top section 9 with a smaller diameter, tubular bottom section 10 telescopically mounted in the top section 9. The sections 9 and 10 are releasably locked in one position by pins 11 extending through diametrically opposed holes 12 (FIGS. 3 and 5) in the top and bottom sections 9 and 10, respectively. As shown in FIG. 5, a plurality of spaced apart, opposed holes 12 in the bottom section 10 permit individual adjustment of the length of the legs 7 so that the evaporator can be stabilized on uneven terrain. Stops defined by rectangular projections 13 are provided near the bottom end of each leg 7 for limiting movement of the bottom section 10 into the top section 9. Rectangular feet 14 are welded to the bottom ends of the legs 7 at an angle of 45° to the longitudinal axes of the legs for penetrating the ground, thus providing additional stability.

The crossbars 8 are defined by rectangular cross section, steel tubes. Square cross section tubes 15 (FIGS. 2 to 5) are welded to the crossbars 8 to define a support for a rectangular top plate 16. A cylindrical tubular post 17 (FIGS. 2, 3 and 5) is welded to the two crossbars 8 at the center of the stand 1. The post 17 extends upwardly beyond the top of the stand 1 for rotatably supporting the frame 2 for rotation around a vertical axis. A reinforcing plate 19 with a semi-circular notch (not shown) in one side thereof for receiving the post 17 is welded to the bottom of the crossbars 8 and to the post 17 for added strength. The post 17 extends upwardly through a turntable defined by a circular plate 20 on the bottom of the frame 2 and a sleeve 21 carried by the plate 20. The frame 2 is secured in position by a tubular cap 23 (FIGS. 4 and 5) on the top end of the tube 17, and a pin (not shown) which extends through diametrically opposed, aligned holes 25 and 26 in the post 17 and the sleeve 21, respectively.

Figure 4:
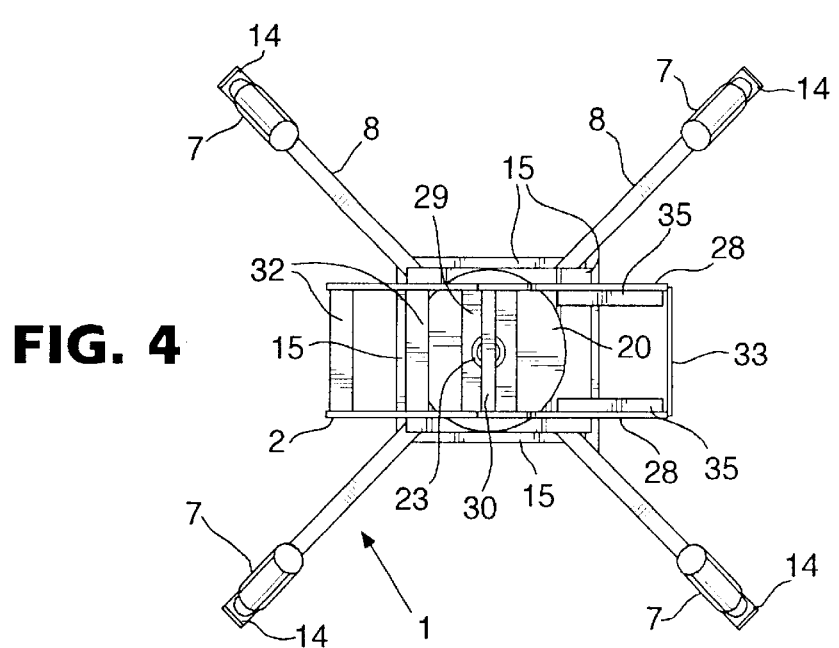
FIG. 4 is a top view of a stand and frame used in the evaporator of FIGS. 1 to 3.

With reference to FIGS. 4 and 5, the skeletal frame 2 includes a pair of parallel, spaced apart sides 28 interconnected at the center by a bottom crossbar 29, which is welded to the turntable 20 and receives the sleeve 21, and a top crossbar 30. Additional crossbars 32 and 33 are provided at the top of the rear end of the frame 2, and at the rear end of the frame, respectively. The crossbars 32 are large angle irons for supporting the motor 3. A pair of inverted L-shaped ledges 35 (FIGS. 4 and 5) are welded to the interior of the sides 28 at the front end of the frame 2 for supporting a cradle 36 (FIG. 1) carrying the fan housing 4. The motor 3 is held in position by triangular braces 38 (FIGS. 1 and 2), and is protected from the elements by an arcuate cover 39 cantilevered from a generally triangular stand 40 mounted on the sides 28 of the frame 2. Side shields 41 are mounted on the stand 40 limiting access to the moving parts at the air inlet end of the machine.

Figure 6:
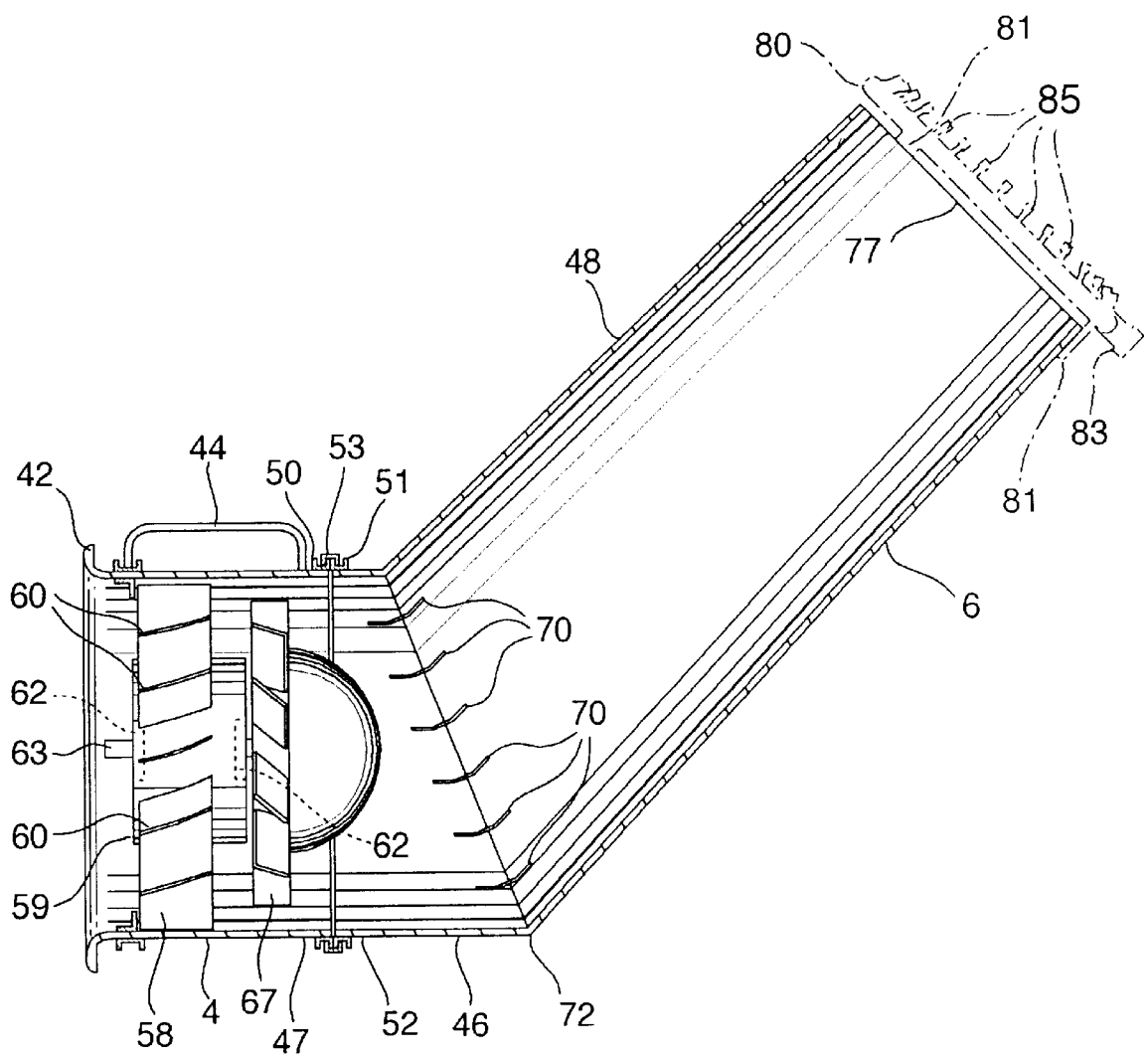
FIG. 6 is a longitudinal sectional view of a housing and nozzle used in the evaporator of FIGS. 1 to 3.

The flared rear or inlet end 42 of the horizontal fan housing 4 is protected by a cage 43, the bottom ends of which are bolted to the sides 28 of the frame 2. Referring to FIGS. 2 and 6, a generally C-shaped handle 44 is provided on the top of the housing 4 to facilitate lifting of the evaporator. The nozzle 6 includes a cylindrical, horizontal bottom arm 46, which is rotatably connected to the front or outlet end 47 of the housing 4, and an upwardly tapering top arm 48 inclined 45° to the horizontal through which a stream of air is discharged from the evaporator. Rings 50 and 51 (FIG. 6) of generally U-shaped cross section are welded to the outlet end 47 of the housing 4 and to the inlet end 52 of the nozzle 6, respectively. The sides of a split ring 53 with a cross section which is the reverse of that of rings 50 and 51 embraces the abutting outer sides of the rings 50 and 51. Outwardly extending flanges 55 (FIG. 1) on the free ends of the ring 53 are releasably interconnected by a T-shaped bolt 56. When the bolt 56 is manually rotated to loosen the ring 53, the nozzle 6 can be rotated using a handle 57 (FIG. 2) on the bottom of the horizontal arm 46 of the nozzle 6. The bolt 56 is tightened to lock the nozzle 6 in the desired position.

Figure 7:
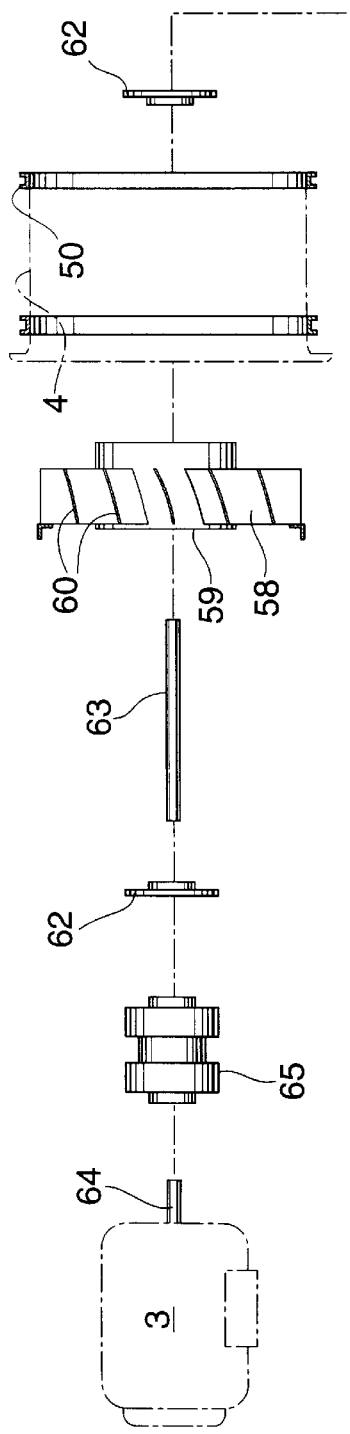
FIG. 7 is an exploded view of a turbine assembly used in the evaporator of FIGS. 1 to 3.
Figure 7:
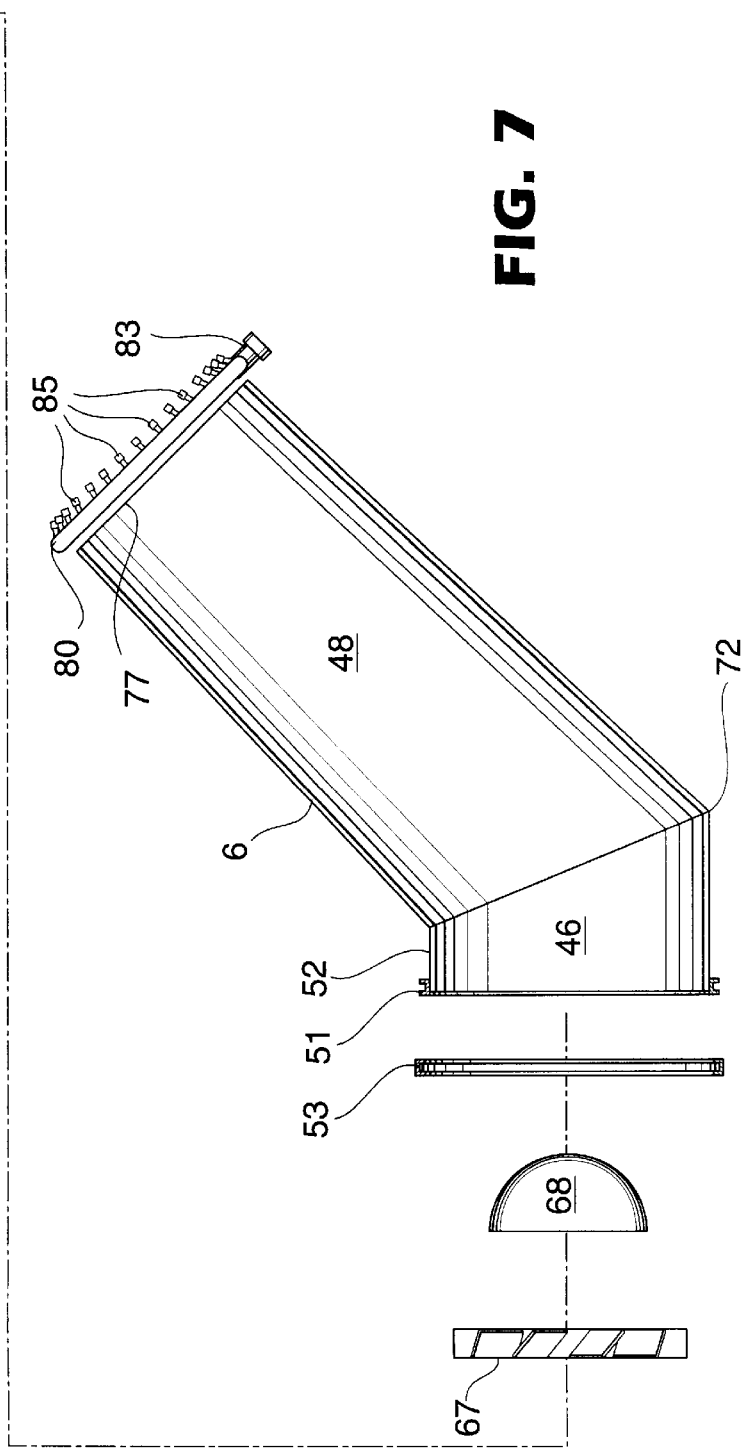

A turbine 58 (FIGS. 6 and 7) is fixedly mounted in the inlet end 42 of the housing 4. The turbine 58 includes a hollow, cylindrical hub 59 with closed ends, and blades 60 extending radially outwardly from the hub 59 to the housing 4. The outer ends of the blades 60 are connected to the interior of the housing 4. Thus, the turbine acts as a stator for cutting and directing air entering the inlet end 42 of the housing 4.

A pair of bearings 62 in the ends of the turbine hub 59 rotatably support a shaft 63, which is connected to the shaft 64 of the motor 3 by a flexible coupler 65 (FIG. 7) available from T. B. Woods, Chambersburg, Pa. A fan 67 and a generally hemispherical nose cone 68 are mounted on the outer end of the shaft 63 for rotation therewith. Actuation of the motor 3 results in the drawing of air into the rear end 42 of the housing 4 for discharge through the nozzle 6.

Figure 8:
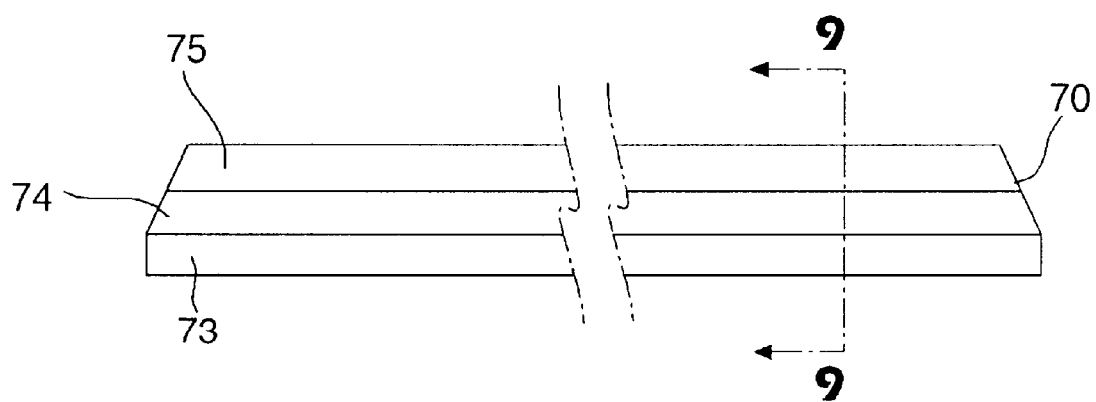
FIG. 8 is a top view of a louver used in the nozzle of FIG. 6.
Figure 9:
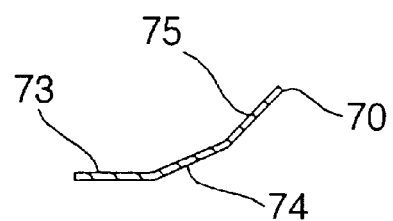
FIG. 9 is a cross section of the louver taken generally along line 9—9 of FIG. 8.

With reference to FIGS. 6, 8 and 9, a plurality of parallel louvers 70 extend across the nozzle 6 at the elbow 72 between the horizontal and inclined arms 46 and 48, respectively of the nozzle 6. Each louver 70 includes a horizontal lower section 73, an intermediate section 74 bent 22.5° with respect to the lower section 73, and an upper section 75 bent 22.5° with respect to the intermediate section, i.e. 45° from the horizontal. The louvers 70 redirect air entering the inlet end 52 of the nozzle 4 upwardly through the inclined arm 48 to the outlet end 77 thereof.

An annular manifold 80 is mounted on the upper, outlet end 77 of the nozzle 6 using brackets 81. An inlet tube 83 in the bottom of the manifold 80 introduces water pumped from a tailings pond through a hose 84 (FIG. 2) connected to the inlet tube. The water is discharged through a plurality of atomizing jets or nozzles 85 into the stream of air exiting the nozzle 6. The jets 85 extend radially upwardly and inwardly for providing a fine mist of water particles, which are picked up by the air under pressure to accelerate evaporation. The nozzle 6 can readily be rotated to a plurality of positions (FIG. 5) so that residual spray does not land in the same place each time and cause erosion.

What is claimed is:

1. A portable evaporator for evaporating a liquid comprising:

(a) a stand for supporting the evaporator in a fixed position;

(b) a frame rotatable on said stand for rotation around a vertical axis;

(c) a tubular horizontal housing on said frame, said housing having first and second open ends;

(d) a fan in said housing;

(e) a motor on said frame at the first open end of said housing for driving said fan to move air through said housing from said first open end to the second open end thereof;

(f) an elongated tubular nozzle extending upwardly and outwardly from said second open end of said housing for discharging a stream of air from the evaporator;

(g) a manifold around an upper outlet end of said nozzle for receiving liquid from a source thereof; and (h) a plurality of jets in said manifold for discharging atomized liquid into the stream of air exiting said nozzle, whereby evaporation of the liquid is facilitated.

2. The evaporator of claim 1, wherein said stand includes a plurality of telescopically adjustable legs for supporting the evaporator on uneven terrain, and crossbars extending between top ends of the legs rotatably supporting the frame.

3. The evaporator of claim 2, wherein said frame includes a turntable rotatable on the crossbars of said stand, said turntable defining the bottom of the frame; a pair of spaced apart parallel sides; and cradles mounted on said sides supporting said motor and said housing on the frame.

4. The evaporator of claim 3, wherein said nozzle includes a horizontal bottom arm rotatably connected to said second open end of said housing for rotation around a horizontal axis, said bottom arm having an inlet end for receiving air from said second open end of the housing; and an inclined arm having said upper outlet end.

5. The evaporator of claim 4, including a plurality of louvers in said nozzle for directing air from said bottom arm through said inclined arm.

6. The evaporator of claim 4, including a split ring for releasably locking said inclined arm in one of a plurality of positions on said bottom arm.

* * * * *